United States Patent Office 3,486,718
Patented Dec. 30, 1969

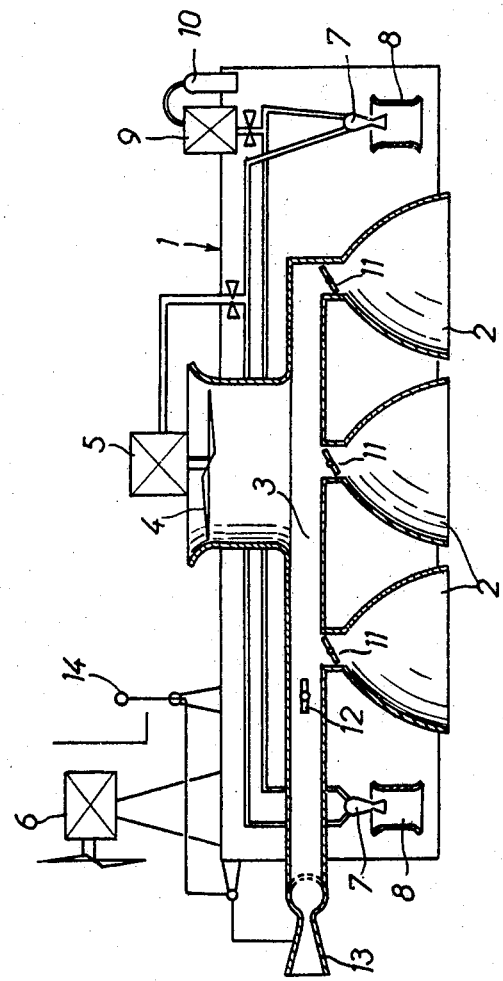

3,486,718
CONVERTIBLE GROUND-EFFECT/V.T.O.L VEHICLE
Raymond Hippolyte Firmin Marchal, Paris, Don Pierre Louis Jean Colombani, Latresne, and Adolphe Otton Gontier Ernst, Lege, France, assignors to Societe Nationale d'Etude et de Constructions de Moteurs d'Aviation, Paris, France
Filed Sept. 11, 1967, Ser. No. 666,769
Claims priority, application France, Sept. 12, 1966, 76,054
Int. Cl. B60c 29/00
U.S. Cl. 244—23                    1 Claim

ABSTRACT OF THE DISCLOSURE

A ground-effect vehicle which can be converted to a vertical take-off and landing machine, comprising in addition to the usual air-cushion generating devices used to provide ground-effect lift, rockets or other engines, for example located at the four corners of the vehicle, which produce an upward directed take-off thrust, the operation of these engines enabling the vehicle to leapfrog over obstacles, and a conjugated control device operative at the commencement of leapfrogging, in order to cut the supply to the air-cushions which then cease to have any effect since the vehicle is no longer supported by ground-effect.

---

It is well known that ground-effect vehicles, also known as air-cushion vehicles, have very high maneuverability on flat or only very slightly irregular terrain. On the other hand, they are quite unable to surmount obstacles such as cliffs, woods, and steep slopes.

The invention aims at extending the scope of application and use of these vehicles by providing them with means by which they can effectively hop over obstacles, by the introduction of a vertical thrust which is sufficient to lift the vehicle. This vertical thrust may be provided by any suitable engine driven device such as airscrews or ducted fans, but in the following, in order to simplify matters, reference will be made exclusively to the use of rockets.

In accordance with the invention, the ground-effect vehicle comprises, in addition to the usual devices for generating the air-cushion, rockets which are downwardly orientated and are located for example at the four corners of the vehicle, the ignition of these rockets enabling the vehicle to "leapfrog" over obstacles.

In a preferred embodiment of the invention, a conjugated control device is provided which, on the one hand starts the rockets during the leapfrogging phase, and on the other cuts the air-cushion supply, the air-cushion being totally ineffective at this time due to the distance of the vehicle from the ground, and the compressed air which is thus available advantageously being employed to stabilise the vehicle during the leapfrogging phase, by the provision of suitable nozzles.

The single figure of the drawing is a vertical schematic section through an improved ground effect vehicle in accordance with the invention.

In the embodiment illustrated in the drawing, the reference 1 indicates the platform or chassis of the ground-effect vehicle, this being borne by cushions of compressed air confined in the bell-shaped housings or plenum chambers 2 which are connected to a manifold 3 into which feeds a compressor or fan 4 driven by an engine 5. The translatory motion of the vehicle is produced by an engine-driven airscrew 6.

In accordance with the invention, the vehicle is equipped with four rockets 7 associated with venturis 8 which introduce dilution air, the rockets being disposed at the four corners of the vehicle and being orientated downwardly in order to produce a lift thrust. These rockets are of the hypergolic liquid type, thus enabling easy control of the thrust to be effected so that the height of leapfrogging can be matched to various sizes of obstacles and so that the speeds during the ascent and descent can be regulated as necessary.

Advantageously, the rocket propellants used will be the kerosene or other fuel used by the engines of the vehicle, together with a solution of nitrogenperchlorate in 25% of water, the latter solution contained in a reservoir 9 which is pressurized by a container 10 of compressed nitrogen.

Communication between each plenum chamber of the air-cushion 2 and the manifold 3 can be closed by means of chokes 11 which close at the same time as and in conjugation with a by-pass choke 12 which then opens in order to supply one or more directable stabiliser and control nozzles 13, which are under the control of a lever 14 operated by the pilot.

The vehicle which has just been described operates in the following manner:

There are two clear ways in which obstacles may be negotiated by bringing auxiliary rockets into play, assuming that the lift and drag forces are negligible in relation to the inertia forces.

The first method concerns a vehicle which is moving at a constant horizontal speed. In order to carry out the jumping or leapfrogging action, a vertical force greater than the weight of the vehicle is applied to the vehicle by the rockets for a certain period of time, until a limiting vertical velocity is reached. The thrust is then cut. The vehicle then follows a ballistic trajectory, passing through an apogee point. If the speed of descent has the same set limit as the speed of ascent, the thrust will be cut in again at the same level and the machine will be braked in such a manner that it theoretically meets the ground at zero velocity.

The second method concerns a vehicle which is at a standstill. A vertical force is produced by the rockets in such a way that the vehicle reaches a certain rate of ascent. The thrust is then temporarily cut until the vertical speed is zero. A thrust equivalent to the weight of the vehicle is then applied. A horizontal force supplied by the normal tractive power plan is then applied to the vehicle which accordingly flies parallel to the ground. After clearing the obstacle, the translatory speed of the vehicle is reduced to zero by causing the same tractive power plant to operate in the opposite direction. The vehicle will then be stationary above the ground, maintained at the particular altitude by the vertical thrust. This lift force is temporarily cut. The machine commences to descend and is braked by cutting the vertical thrust in again.

Since the flight may last for a substantial time when clearing normal obstacles (for example in the order of 10 to 15 seconds), it is necessary to provide the vehicle with some stabilising means. In accordance with a further feature of the invention, at the commencement of leapfrogging, the chokes 11 feeding the plenum chambers 2 will be closed and at the same time the choke 12 supplying the directable nozzles 13 will be opened, so that stabilising couples can be produced.

What is claimed is:
1. A convertible ground-effect/V.T.O.L. machine comprising a selectively activatable bi-propellant rocket motor having a fuel supply and an oxidize supply and arranged for discharging a motive flow to produce upward thrust on the machine, a cushion system on the underside of the machine, an engine-driven fan having the same fuel supply as said rocket motor, supply piping means between said fan and said cushion system, and supply control valve means in said piping means selectively adjustable to an open position when said rocket motor is not activated whereby said cushion system is supplied with an underpressure from said fan and said machine operates as a ground-effect machine, and to an obturating position when said rocket motor is activated whereby said cushion system is cut off from said fan and said machine operates as a V.T.O.L. machine.

References Cited

UNITED STATES PATENTS

| | | | |
|---|---|---|---|
| 3,417,943 | 12/1968 | Page | 244—23 |
| 2,989,271 | 6/1961 | Bohr | 244—23 |
| 3,130,939 | 4/1964 | Alper et al. | 244—23 X |
| 3,117,643 | 1/1964 | Cockerell | 244—23 X |
| 2,753,934 | 7/1956 | Marsden | 60—257 X |
| 3,095,694 | 7/1963 | Walter | 60—257 X |
| 3,278,138 | 10/1966 | Haberkorn | 244—74 X |

MILTON BUCHLER, Primary Examiner

T. W. BUCKMAN, Assistant Examiner

U.S. Cl. X.R.

244—2, 58, 74; 180—117